(12) United States Patent
Sasazaki et al.

(10) Patent No.: US 7,472,998 B2
(45) Date of Patent: Jan. 6, 2009

(54) VARIABLE APERTURE DISPLAY DEVICE

(75) Inventors: Yukihiro Sasazaki, Tokyo (JP); Yoshitake Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 230 days.

(21) Appl. No.: 11/244,139

(22) Filed: Oct. 6, 2005

(65) Prior Publication Data

US 2006/0077283 A1    Apr. 13, 2006

(30) Foreign Application Priority Data

Oct. 8, 2004    (JP)    ............................ P2004-296280

(51) Int. Cl.
- G03B 21/14    (2006.01)
- G03B 7/00    (2006.01)
- G03B 9/04    (2006.01)

(52) U.S. Cl. ............................ 353/97; 396/64; 396/108; 396/459; 396/164

(58) Field of Classification Search .................... 353/97; 396/64, 48, 80, 108, 459, 166, 219, 164, 396/282

See application file for complete search history.

(56) References Cited

U.S. PATENT DOCUMENTS

| | | | |
|---|---|---|---|
| 5,442,484 A | * | 8/1995 | Shikawa ...................... 359/651 |
| 5,671,993 A | * | 9/1997 | Shikama ...................... 353/77 |
| 7,220,006 B2 | | 5/2007 | Allen et al. |
| 2002/0021292 A1 | | 2/2002 | Sakashita |
| 2003/0142275 A1 | | 7/2003 | Yoshida |
| 2003/0146919 A1 | | 8/2003 | Kawashima et al. |

FOREIGN PATENT DOCUMENTS

| | | |
|---|---|---|
| JP | 10-329541 | 12/1998 |
| JP | 2000-149654 | 5/2000 |
| JP | 2003-036063 | 2/2003 |
| JP | 2003-107422 | 4/2003 |
| JP | 2003-167214 | 6/2003 |

* cited by examiner

Primary Examiner—Diane I Lee
Assistant Examiner—Magda Cruz
(74) Attorney, Agent, or Firm—Finnegan, Henderson, Farabow, Garrett & Dunner, L.L.P.

(57) ABSTRACT

A display device able to give an image giving a good impression such as a sharp contrast in a dark scene and maintaining brightness in a bright scene, that is, a display device comprising a variable aperture iris and a control circuit for controlling opening/closing of the iris in accordance with a state of a level of an input signal forming a screen, wherein the control circuit controls the iris so that a response of an open/close operation of the iris is different between a case where the signal level fluctuates from a dark level to a bright level and a case where the signal level fluctuates from a bright level to a dark level.

20 Claims, 11 Drawing Sheets

IRIS OFF (FULLY OPEN: 0% LIGHT BLOCKING)

IRIS ON (50% LIGHT BLOCKING, FIXED MODE)

IRIS OFF (FULLY OPEN: 0% LIGHT BLOCKING)

IRIS ON (50% LIGHT BLOCKING, FIXED MODE)

IRIS ON (FULLY CLOSED: 80% LIGHT BLOCKING)

FIG. 10

| IRIS POSITION | CONTROL VOLTAGE VALUE | HALL ELEMENT OUTPUT |
|---|---|---|
| OPEN (Va) | IrisCtlOpenCalib (INITIAL VALUE :0x00) | IriHallOpenCalib |
| CLOSE (Vb) | IrisCtlCloseCalib (INITIAL VALUE :0xFF) | IriHallCloseCalib |

VARIABLE APERTURE DISPLAY DEVICE

CROSS REFERENCES TO RELATED APPLICATIONS

The present invention contains subject matter related to Japanese Patent Application No. 2004-296280 filed in the Japan Patent Office on Oct. 8, 2004, the entire contents of which being incorporated herein by reference.

BACKGROUND OF THE INVENTION

1. Field of Invention

The present invention relates to a display device such as a liquid crystal projector or other display device for displaying an image based on for example a video signal.

2. Description of the Related Art

A liquid crystal projector is a projector device using a spatial light modulator using a liquid crystal material (hereinafter referred to as a "liquid crystal panel"). In a liquid crystal projector, the liquid crystal panel itself does not emit light. Therefore, a liquid crystal projector combines a liquid crystal panel and a light source and emits light to the liquid crystal panel to illuminate it. Then, it applies a video signal to the liquid crystal panel and projects the image formed by the liquid crystal panel onto a screen by a projection lens. A liquid crystal projector having such a configuration enables a small sized, highly efficient projector device to be realized.

Liquid crystal materials include materials by nature changing the polarization of incoming light in accordance with the applied electric field (light modification characteristic). As liquid crystal panels, there are many panels modulating light by utilizing this property. For this reason, the light striking a liquid crystal panel must be linearly polarized (p-polarized or s-polarized) in a certain direction. The light emitted from the liquid crystal panel is rotated in its polarization direction according to the video signal applied to the liquid crystal panel. Therefore, a polarizer is arranged as a photodetector on an emitting side of the liquid crystal panel in order to modulate the light.

Further, as a liquid crystal projector, a projector having an iris ON/OFF mode switch in order to obtain a display image which can be seen more easily according to the environment where the screen is placed has been proposed (see for example Japanese Unexamined Patent Publication (Kokai) No. 2003-107422).

SUMMARY OF THE INVENTION

A projector having an iris ON/OFF switch, however, is limited in improvement of performance. By the two-mode switching of the iris ON/OFF modes, when reproducing a movie or other program having many dark scenes, the mode is switched to a low voltage mode lowering a lamp drive voltage and, further, the iris is turned on (example, for a light blocking rate of 20%) to lower the black level to improve the contrast ratio. Due to this, in a dark scene, a good image having a sharp contrast is obtained. However, during viewing, the iris is always on and a partial light blocking state is exhibited. Simultaneously, the white level is lowered. Therefore, the luminance in a bright scene is correspondingly lowered. If setting a comfortable light blocking rate, no major improvement of the contrast ratio can be expected. Namely, there is the disadvantage that even in a bright image not requiring an irising effect, the whole image becomes dark, and the image ends up appearing to be inferior in quality.

It is therefore desirable to provide a display device able to give an image having a high contrast ratio in a dark scene, maintaining brightness in a bright scene, and thereby giving a good impression even if the brightness of the scene changes.

According to a first aspect of an embodiment of the present invention, there is provided a display device having a variable aperture iris and a control circuit for controlling opening/closing of the iris in accordance with a state of a level of an input signal forming a frame, wherein the control circuit controls the iris so that a response of an open/close operation of the iris is different between a case where the signal level fluctuates from a dark level to a bright level and a case where the signal level fluctuates from a bright level to a dark level.

Preferably, the control circuit controls the iris so that the response of the open/close operation of the iris becomes faster in the case where the signal level fluctuates from the dark level to the bright level in comparison with the case where the signal level fluctuates from the bright level to the dark level.

Preferably, the control circuit divides a sum of signal levels of a designated detection area in the screen by an area of the detection area to obtain a first value, divides a change of the first value by a predetermined weight coefficient to obtain a second value, and sets a control signal value of the iris based on the second value.

Preferably, the control circuit performs the division by weight coefficients different between the case where the signal level fluctuates from a dark level to a bright level and the case where the signal level fluctuates from a bright level to a dark level.

Preferably, the device has a register able to designate the detection area and able to shift the detection area in at least one of a horizontal direction and a vertical direction of the detection area, and the control circuit can calculate a value for designating the detection area based on the instructed shift and set it in the register when receiving an instruction of a shift to at least one of the horizontal direction and the vertical direction of the detection area.

Preferably, the control circuit performs correction processing matching the first value with the format of an input signal.

According to a second aspect of an embodiment of the present invention, there is provided a display device having a variable aperture iris, a control circuit for controlling opening/closing of the iris in accordance with a state of a level of an input signal level forming a frame, and a signal adjustment unit able to adjust the gain of the signal to be displayed, wherein the control circuit controls the iris so that the response of the open/close operation of the iris differs between the case where the signal level fluctuates from a dark level to a bright level and the case where the signal level fluctuates from a bright level to a dark level, then makes the signal adjustment unit adjust the gain corresponding to the iris control.

Preferably, the control circuit divides a sum of signal levels of a designated detection area in the screen by an area of the detection area to obtain a first value, divides a change of the first value by a predetermined weight coefficient to obtain a second value, and sets a control signal value of the iris and a control signal value of the gain based on the second value.

Preferably, when controlling the iris and the gain of the signal adjustment unit based on the second value, the control circuit sets the first value starting the control different between the control of the iris and the control of the gain of the signal adjustment unit.

According to a third aspect of an embodiment of the present invention, there is provided a display device having a light modulating unit for modulating incident illumination light based on an input image signal and emitting the result, a variable aperture iris unit for opening or closing an iris so as to form an aperture having a concentric circular state with respect to a light axis and adjusting the amount of the incidence of the illumination light upon the light modulating unit based on a control signal, a detection unit for detecting an average signal level of the input image signal, a signal adjustment unit able to adjust the gain of the image signal to be displayed, and a control circuit for controlling the iris so that the response of the open/close operation of the iris is different between the case where the signal level fluctuates from a dark level to a bright level and the case where the signal level fluctuates from a bright level to a dark level, then making the signal adjustment unit adjust the gain corresponding to the iris control.

According to embodiments of the present invention, for example the control circuit controls the response of the open/close operation of the iris to differ between the case where the signal level fluctuates from a dark level to a bright level and the case where the signal level fluctuates from a bright level to a dark level. Then, the signal adjustment unit is made to adjust the gain corresponding to the iris control parallel to this.

BRIEF DESCRIPTION OF THE DRAWINGS

These and other objects and features of the present invention will become clearer from the following description of the preferred embodiments given with reference to the attached drawings, wherein:

FIG. 10 is a graph of the state storing a position Va of the iris open state, a position Vb of an iris closed state (close), a control voltage VCTL, and a Hall element output HOUT in a memory in correspondence;

DESCRIPTION OF THE PREFERRED EMBODIMENTS

Below, an explanation will be given of an embodiment of the present invention with reference to the attached drawings.

Figure 1:
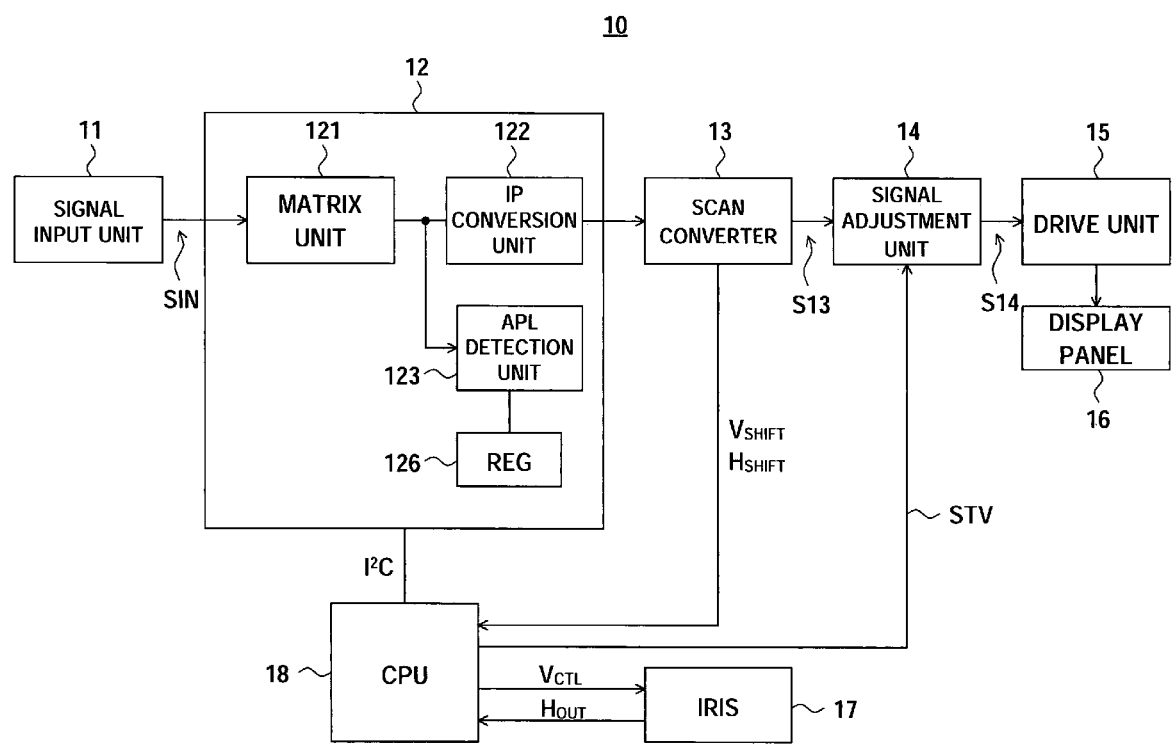
FIG. 1 is a block diagram of a signal processing system of a display device according to an embodiment of the present invention.

FIG. 1 is a block diagram of the configuration of a signal processing system of a display device according to an embodiment of the present invention.

A display device 10 according to the present embodiment is applied to for example a liquid crystal projector and has an ON/OFF mode switching function and an iris auto (AUTO) function of an iris so as to obtain a display image which is more easily seen in accordance with the environment where the screen is placed.

The present display device 10, as shown in FIG. 1, has an input signal processing unit 11, a conversion/detection unit 12, a scan converter 13, a signal adjustment unit 14, a drive unit 15, a display panel 16 such as a liquid crystal display panel (LCD), an iris 17 as one of the objects for control, and a CPU 18 as a control circuit.

Then, when the iris auto (AUTO) function is applied, the aperture of the iris and the signal level driving the display panel 16 are controlled based on the average luminance information of the video signal. For example, when a dark frame is input as the video signal, the aperture of the iris is made small to restrict the optical output, the signal level driving the display panel 16 is made high, and a picture of a predetermined gradation level is displayed. By performing such control, the dynamic range able to be displayed by the display panel 16 is more widely utilized, and excellent gradation can be expressed even in a dark picture. Further, when the display panel 16 is a liquid crystal panel, making the aperture small enables the angle of luminous flux incident upon the liquid crystal panel to be made small, improves the incident angle characteristic (field of view dependency), and improves the contrast.

The input signal processing unit 11 converts a variety of input signals SIN to a signal format (for example RGB signals) suitable for the conversion/detection unit 12 and outputs the same to the conversion/detection unit 12. The input signals SIN include video signals reproduced by a DVD player etc., signals decoded from a tuner, component video signals, composite video signals, RGB signals, etc.

The conversion/detection unit 12 has, as principal components, a matrix unit 121 for performing matrix conversion processing to for example a luminance (Y)/color difference signal based on the signal SIN input from the input signal processing unit 11, an IP conversion unit 122 for performing interlace-progressive (IP) conversion processing with respect to the output signal of the matrix unit 121, an APL detection unit 123 for detecting information concerning the average luminance of the video signal configured by an APL based on the sum of pixel data in a predetermined region of for example 1 frame of the continuously input video signal based on the output signal of the matrix unit 121, and a register 126 in which the value of the APL detected at the APL detection unit 123 is set and accessed by the CPU 18.

The APL detection unit 123 includes edge detection circuit for discriminating at which position a reproduced image is present in a valid area for detecting the APL. The valid image region is designated by a setting value of a not shown register. The edge detection circuit detects at which position the actually input signal is present in this valid image region. Concerning the APL detection, it is necessary to set the register Top/Bottom/Left/Right values of the detection area for each status (for each format of the input signal) as mentioned above. These values are position data of the top, bottom, left, and right of a rectangular region for detecting the APL and are calculated by for example the CPU 18 from the values of Vshift/Vresolution/Hshift/Hresolution of each status. The values of Vresolution/Hresolution indicating the resolution in the vertical direction/horizontal direction of the input signal are fixed in status. The signal shifts (offsets) Vshift/Hshift in the vertical direction/horizontal direction in the display screen refer to actually reflected values. For example, when the user shifts the valid image region to the horizontal and/or vertical direction by a not shown remote control device and the values of Vshift/Hshift are changed, the CPU 18 refers to the changed values and sets the values of the register Top/Bottom/Left/Right. In the case of an unknown signal, the Vresolution/Hresolution values are referred from the original status.

The scan converter 13 performs pixel number conversion processing matching the signal IP converted by processing by the conversion/detection unit 12 to the size of the display panel 16, addition of a graphical instruction region (OSD) of a GUI, etc. and outputs the results as a signal S13 to the signal adjustment unit 14. When the scan converter 13 receives a command for shifting the valid image region to the horizontal and/or vertical direction by the user using a not shown remote control device and changing the values of Vshift/Hshift, and notifies this change information to the CPU 18. The CPU 18 calculates the values of the register Top/Bottom/Left/Right according to the predetermined method explained later and sets the register values of the conversion/detection unit 12.

The signal adjustment unit 14 performs adjustment (image processing) such as color conversion, gamma adjustment, and sharpness adjustment with respect to the output signal of the scan converter 13 and outputs the result as a signal S14 to the drive unit 15. The signal adjustment unit 14 has a gain (contrast) control register USC SUBCONT in which a value for controlling the gain (contrast) by the CPU 18 is set. A variable range of for example the gain (contrast) is set to 1 to 1.5 times the value set in the gain (contrast) control register USC_SUBCONT. Specifically, the CPU 18 makes the setting value STV of the gain (contrast) control register USC_SUBCONT variable in a range of 0 to 63. The signal adjustment unit 14 is configured so as to able to attain a gain (contrast) of 1.5 times at the maximum according to for example the following equation when the setting value STV is 63. Here, IN indicates the input signal level to the signal adjustment unit 14, and OUT indicates the output signal level from the signal adjustment unit 14.

$$OUT = IN \times (128 + STV)/128$$

The drive unit 15 generates a signal required for driving the display panel 16 by the output signal from the signal adjustment unit 14. Further, it performs processing for absorbing variations of the display panel 16 etc. The drive unit 15 has a configuration changing in accordance with the devices of the display panel 16.

The display panel 16 is driven by the drive unit 15 and displays an image based on the input picture (signal etc. from the DVD player).

The iris 17 is for example arranged between a first microlens array (MLA) and a second MLA of the illumination optical device of the liquid crystal projector and at substantially an intermediate position between the two with substantially the same distances as will be explained later and opens/closes concentrically with respect to the light axis based on the control voltage VCTL from the CPU 18. The iris 17 is continuously variably operated so as to have the optimum iris aperture size in accordance with the average luminance level of the video signal so that the iris aperture size is large when the average luminance level is high and the iris aperture size is small when the average luminance level is low. The iris 17 is controlled so that the illumination F number becomes the maximum at the black side. Further, the iris 17 is controlled so that the illumination F number becomes the minimum and the iris aperture size becomes 100% at the white side. Further, the iris 17 is structured so that the aperture size does not become 0%.

In the iris 17, there are six or more blinds having the same shape. These iris blinds are synchronously opened/closed. The surfaces of the iris blinds are finished by gloss plating. Projections are provided on the blind surfaces in regions where the blinds are superimposed with each other so that point contact is possible. Further, the iris 17 is structured mounting a driving actuator for driving the iris blinds to open/close the same and an aperture position detecting sensor of the blinds in a heat insulated state. The driving actuator is arranged on the emitting side with respect to the light source. Further, the iris 17 is configured so that not to use a stroke limit (mechanical end position) at which the actuator operates. Further, the iris 17 is arranged near the light source, therefore has a structure forcibly cooling the driving actuator and, at the same time, has a structure forcibly cooling the blinds of the illuminated iris and its periphery.

Below, an explanation will be given of a specific configuration and functions of the iris 17, the control voltage of the iris 17 of the CPU 18, and the gain (contrast) control of the signal adjustment unit 14 in sequence with reference to the drawings.

Figure 2:
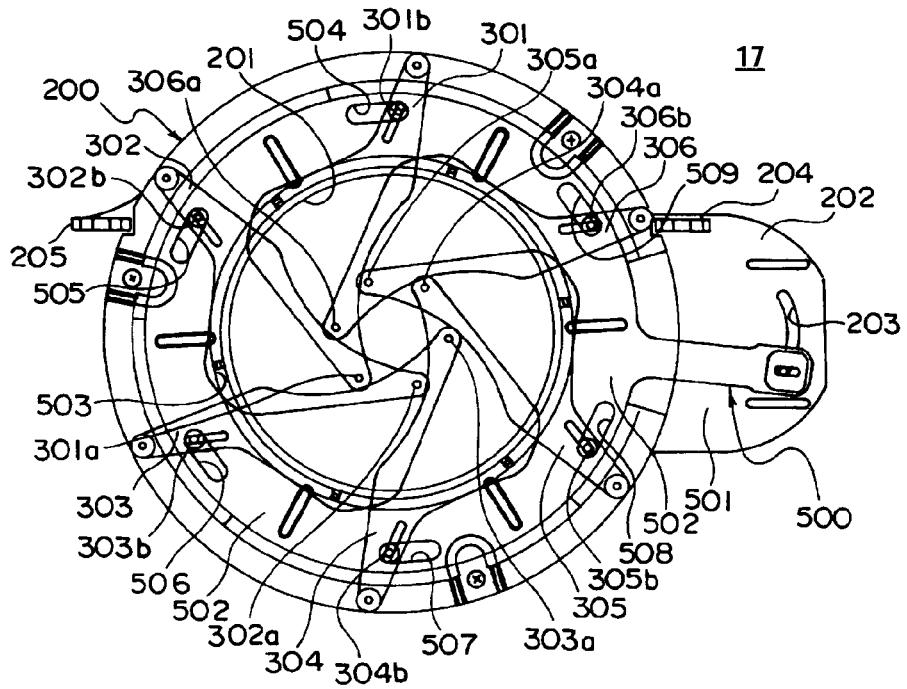
FIG. 2 is a front view of an example of the configuration of an iris according to the present embodiment.
Figure 3:
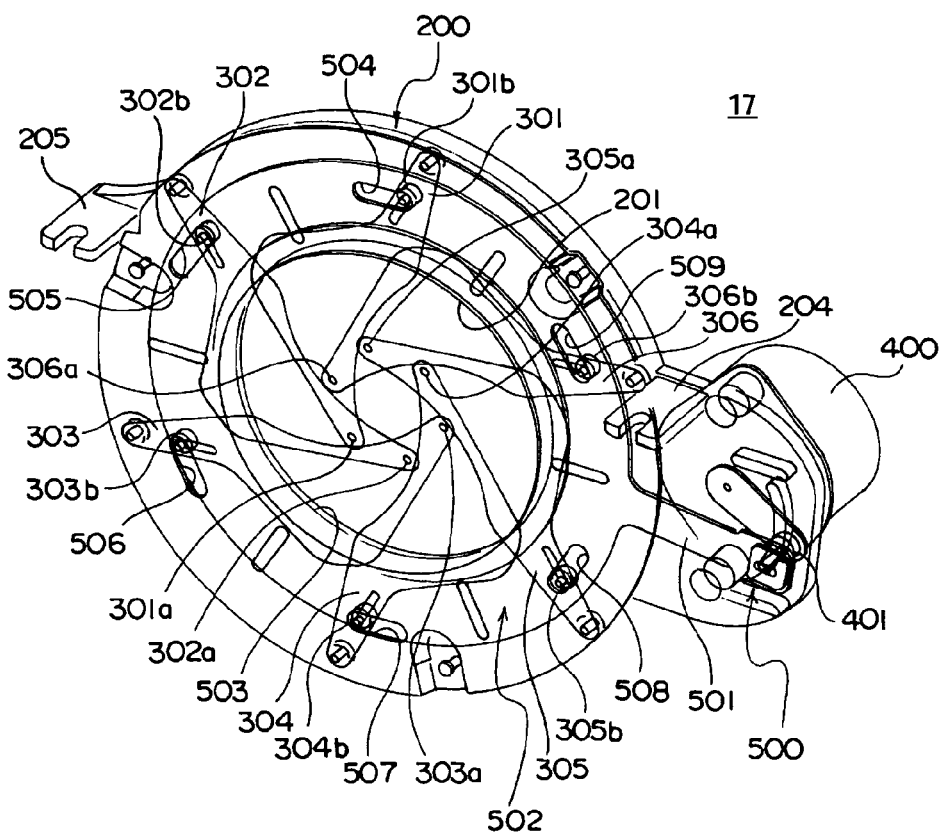
FIG. 3 is a perspective view of an example of the configuration of an iris according to the present embodiment.

FIG. 2 is a front view of an example of the configuration of the iris according to the present embodiment. FIG. 3 is a perspective view of an example of the configuration of the iris according to the present embodiment.

The iris 17 has a main body 200 formed at the center of with an aperture 201 opening in a circular shape and formed by a heat resistant resin such as PPS, a plurality of (six in the present embodiment) iris blinds 301 to 306 having first ends rotatably attached to an outer circumference of one surface of the main body 200 (incident surface of the illumination light L in front of drawing), a drive actuator constituted by a galvanometer 400 which is attached to a mount 202 extending at substantially the center of the right side of the main body 200 in the drawing at the emitting surface side of the illumination light of the main body 200 and which has a first rocking arm 401 attached to its shaft, and a second rocking arm 500 having one end attached to the first rocking arm 401 on the incident surface side of the illumination light L of the main body 200 through a hole formed in an arc shape at the mount 202 of the main body 200 and constituting a restricting part 203 which restricts the range of movement of the first rocking arm 401. Further, at substantially the center of the main body 200 in the drawing, screw mounts 204 and 205 extend to the front (incident side of the illumination light L). When the iris 17 is inserted into the predetermined set position, these screw mounts 204 and 205 abut against the mounting housing and can be screwed into at that position. Further, by simply bringing these mounts 204 and 205 into abutment against the mounting housing, the light axis of the iris 17 and the light axis of the optical device 109 explained later substantially coincide.

The vicinities of the second ends of the iris blinds 301 to 306 (ends able to be located inside the aperture 201) have regions superimposed with each other and are formed at those regions with projections 301a to 306a formed to enable point contact with the adjacent iris blinds. Due to this, the frictional resistance at the time of opening/closing is reduced and a smooth opening/closing operation is realized. Further, the first ends of the iris blinds 301 to 306 (sides near shafts) are formed with guided shafts 301b to 306b.

The second rocking arm 500 has a mounted part 501 forming a straight state and having one end attached to the first rocking arm 401 and a circular part 502 formed on the mounted part 501 in a circular shape from the other end. The second rocking arm 500 is formed by for example sheet metal. The circular part 502 of the second rocking arm 500 is formed with a circular aperture 503 having a slightly larger diameter than the aperture 201 of the main body 200 and is attached to the main body 200 so that this aperture 503 and the aperture 201 of the main body 200 substantially match and it can move to the left and right in FIG. 2 within a predetermined range. In this case, the diameter of the aperture 503 is set so that even when the second rocking arm 500 moves to the left and right, it does not block the aperture 201 of the main body 200.

The circular part 502 is formed with a plurality of (six in the present embodiment) elongated holes 504 to 509 along the circumferential direction. These elongated holes 504 to 509 are engaged with the guided shafts 301b to 306b formed at predetermined positions of the iris blinds 301 to 306, specifically the positions corresponding to positions of formation of the elongated holes 504 to 509 in a state mounted to the main body 200. Due to this, in accordance with movement of the first rocking arm 401 rotating within a predetermined range accompanying driving of the galvanometer 400, the second rocking arm 500 moves to the left and right in the figure within the predetermined range, and the guided shafts 301b to 306b of the iris blinds 301 to 306 are guided in the elongated holes 504 to 509 of the second rocking arm 500 accompanying this, whereby the iris blinds 301 to 306 open/close.

The iris 17 is designed and fabricated so that its outer shape and the center of the aperture of the iris blinds 301 to 306 coincide. The iris 17 is disposed and fixed between the first MLA and the second MLA so that the light axis and the center axis of the iris coincide as mentioned above. When the holding recess on the illumination optical unit side has the iris 17 inserted into it using the outer shape as a guide, the center of the light axis of the illumination light source and the center of the aperture of the iris 17 coincide without the need for any special positioning. The first rocking arm 401 is fixed to the output shaft of the galvanometer 400 and rocks along with the rocking rotation of the galvanometer shaft. A drive pin is fixed to the front end of the first rocking arm 401 and is engaged with a rocking guide groove (restricting part 203) of the second rocking arm 500. The second rocking arm 500 is guided so that it becomes able to rotate about the axis of the illumination light along the rotation direction guides (elongated holes 504 to 509) formed in the iris main body 200 via the first rocking arm 401.

The second rocking arm 500 is provided with engagement pins arranged and fixed on the circumference for synchronously opening/closing the blinds of the iris. The output shaft of the galvanometer 400 and the iris blinds are mechanically connected. When a control voltage for obtaining a predetermined iris aperture is applied to the galvanometer 400, displacement is transmitted in a sequence of the galvanometer output shaft→first rocking arm→second rocking arm→iris blinds so that an iris aperture having any size can be obtained according to the control voltage value from the CPU 18.

Figure 4:
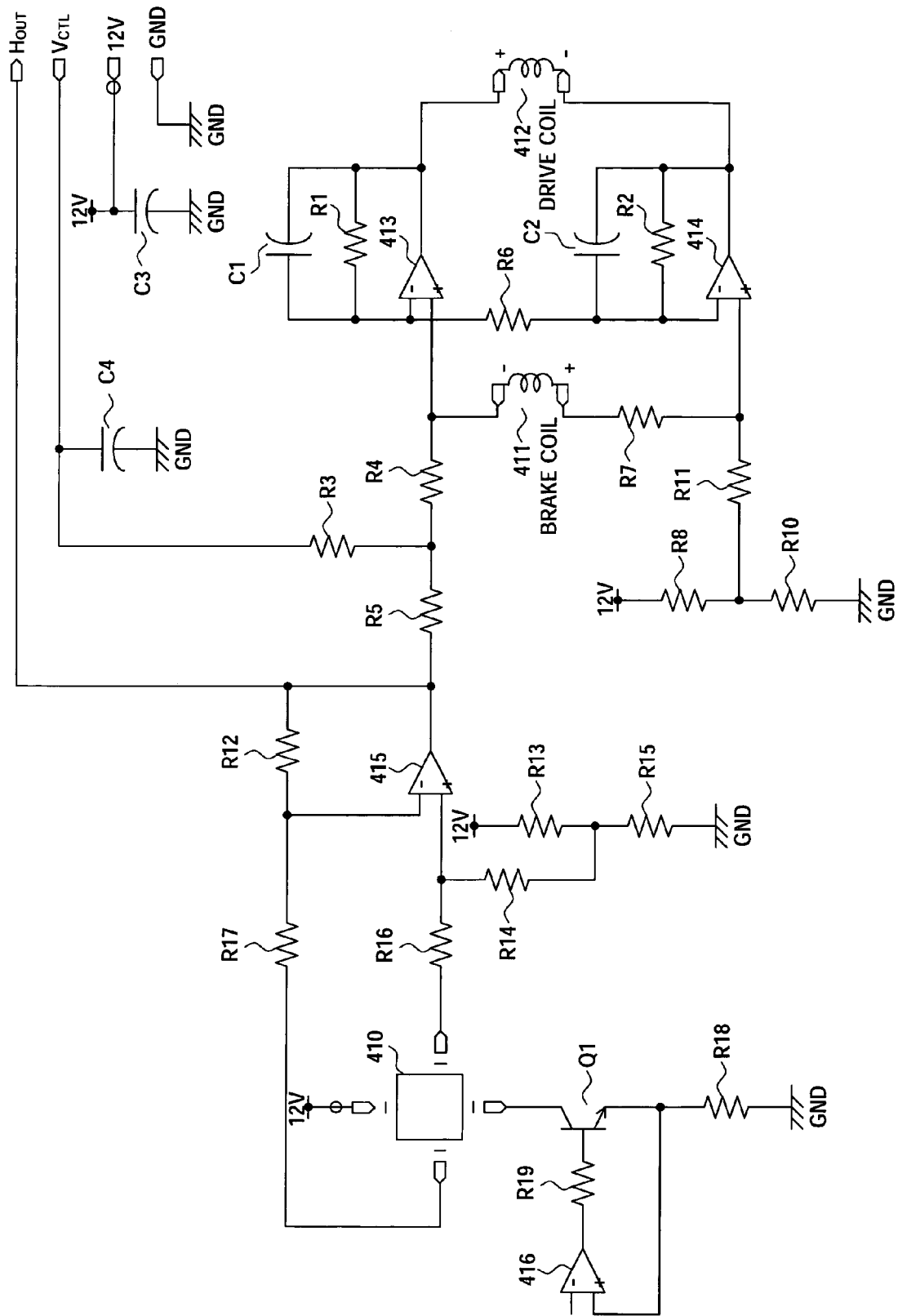
FIG. 4 is a circuit diagram showing an example of a galvanometer according to the present embodiment.
Figure 5:
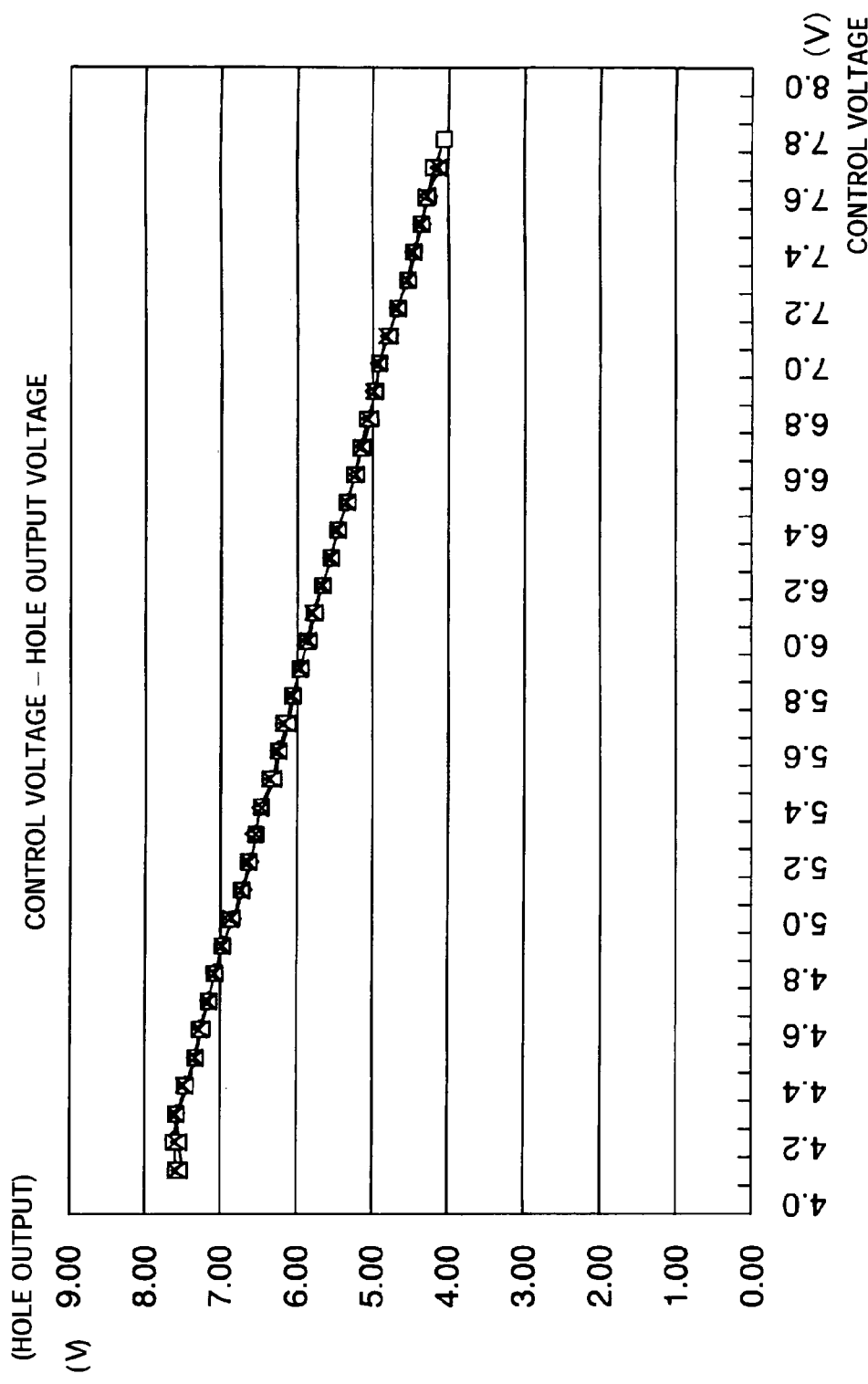
FIG. 5 is a graph showing control characteristics of the galvanometer according to the present embodiment.

FIG. 4 is a circuit diagram of an example of a galvanometer according to the present embodiment. FIG. 5 is a graph of an example of a control characteristic of the galvanometer according to the present embodiment. This galvanometer 400, as shown in FIG. 4, has a Hall element 410, a brake coil 411, a drive coil 412, operational amplifiers 413 to 416, an npn transistor Q1, resistor elements R1 to R19, and capacitors C1 to C4.

When a position signal of a targeted iris size is input as the control signal of the galvanometer 400, a current flows in the drive coil 412 and the output shaft of the galvanometer rotates. Along with the shaft rotation, a rotation position signal is output from the Hall element 410 disposed inside the galvanometer 400. The output shaft stops when it becomes balanced in state with the input control signal. Feedback is always applied and the balanced state is maintained so that the brake coil 411 acts as a pick-up sensor of the drive coil 412 and acts as a brake against abrupt change. In order to eliminate individual differences (variations) between the control voltage VCTL and the rocking angle mainly due to individual differences of the Hall element 410 constituting the galvanometer 400, the element is initialized by the CPU 18 when the power is turned on. The output voltage of the Hall element 410 is used to sample the voltages at the open end and the close end. The absolute amount of the output voltage from the open end to the close end of the iris 17 is stored in a memory provided on the control side. The relationship between the rocking angle and the output voltage is learned from the maximum rocking angle of the galvanometer 400 and the absolute amount of the output voltage. The absolute rotational angle of the output shaft can be positioned at any angle.

Next, an explanation will be given of the reason for the use of the galvanometer 400 as a drive source. The galvanometer 400 can perform high speed operation (about 50 to 70 ms from full opening to full closing) with very little noise at the time of the operation, that is, close to silently. The iris 17 must position the blinds 301 to 306 at the target positions at the predetermined speed and precision. In general, with a pupil type iris, the control method is simple, therefore a stepping motor is frequently used, but when the device is operated continuously and at a high speed in accordance with the degree of illumination of the projected screen, it generates an unpleasant energizing noise during operation, therefore becomes a source of noise in a home projector for which silence is require and is unsuitable for use.

Contrary to this, a galvanometer 400 is driven by only a connection link without any gears which would become a source of noise, thus can suppress mechanical noise. The values of the currents flowing through the drive coil 412 and the brake coil 411 are optimized and the acceleration degree curves at the times of starting and stopping are optimized so as to prevent impact sound due to inertia of the mechanical parts and backlash at times of acceleration and deceleration. The output shaft of the galvanometer 400 generates a mechanical impact sound at the mechanical end position. In actual control, the galvanometer is used inside from the rocking limit, that is, the end position, so as not to cause an impact sound at the end position.

In the iris 17 of the present embodiment, even in the fully closed state, the light blocking rate is not 100%, but is only about 80%. The minimum iris aperture size has a uniformity within the target standard and is determined assuming system trouble such as smoking and fire due to an abnormal temperature rise of the blind surfaces. Along with the reduction of the iris aperture size, the overlay effect of the integrator optical system becomes reduced and nonuniformity of the distribution of light of the cell lenses easy appears on the liquid crystal panel.

Figure 6:
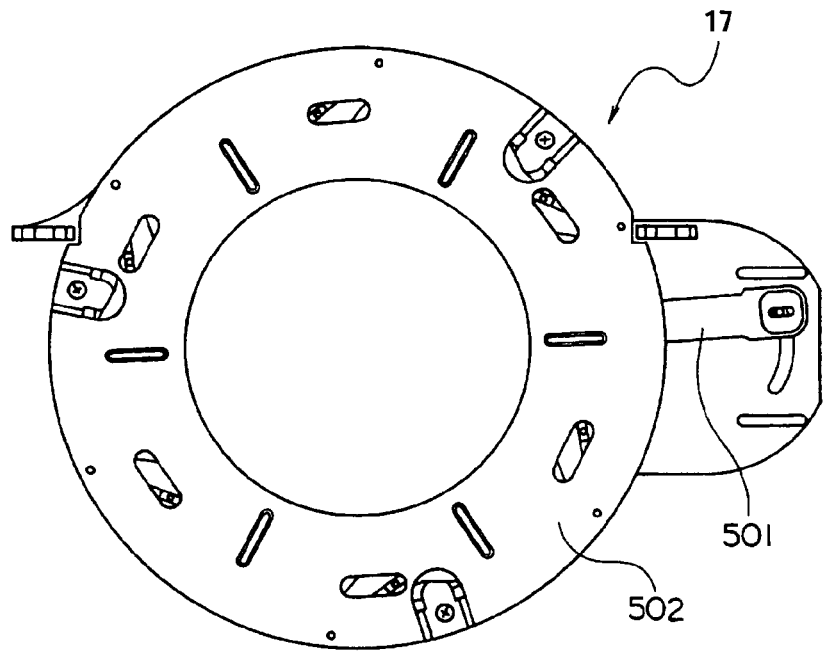
FIG. 6 is a view of the state at the time the iris is off (fully open: 0% light blocking) of the iris according to the present embodiment.
Figure 7:
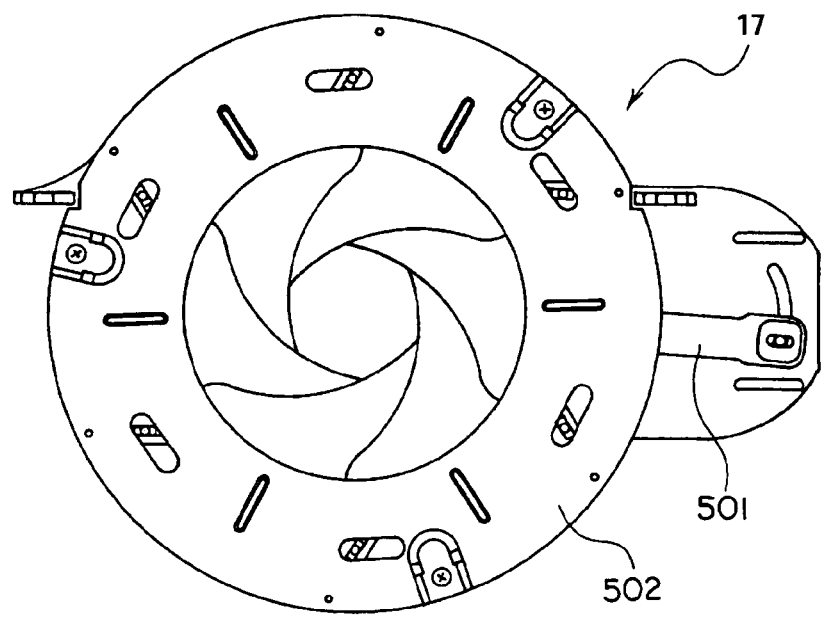
FIG. 7 is a view of the state at the time the iris is on (50% light blocking, fixed mode) of the iris according to the present embodiment.
Figure 8:
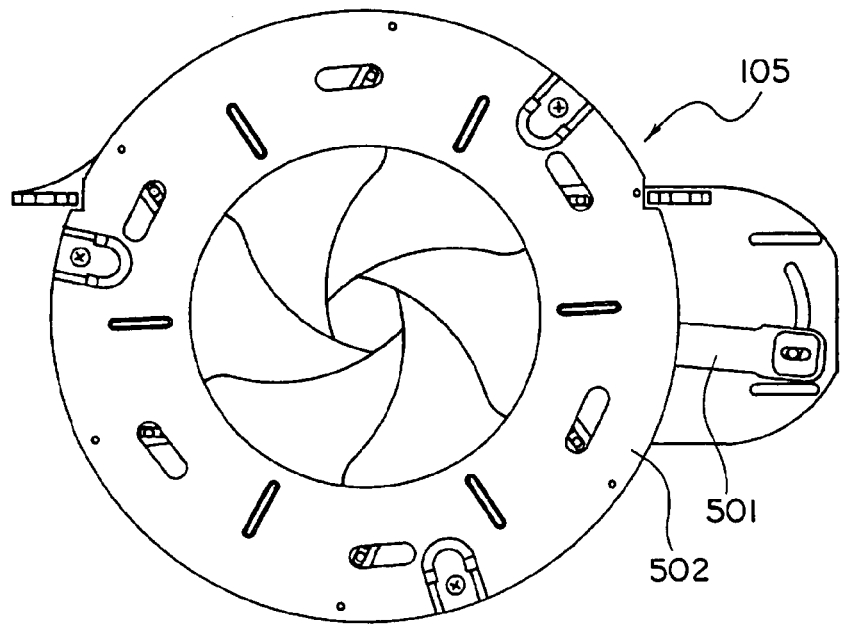
FIG. 8 is a view of the state at the time the iris is on (fully closed: 80% light blocking) of the iris according to the present embodiment.

Next, the iris aperture size will be explained. FIG. 6 is a view of the state of the iris according to the present embodiment at the time when the iris is off (fully open: 0% light blocking). FIG. 7 is a view of the state of the iris according to the present embodiment at the time when the iris is on (50% light blocking, fixed mode). FIG. 8 is a view of the state of the iris according to the present embodiment at the time when the iris on (fully closed: 80% light blocking).

The CPU 18 dynamically changes the aperture size of the iris in the iris 17 as shown in FIG. 6 to FIG. 8 in accordance with the fluctuation of the APL(average picture level). The CPU 18 has three types of setting modes, that is, iris ON/OFF/AUTO modes. The CPU 18 performs variable control so that the optimum iris aperture is obtained when the light blocking rate is 0% in the iris fully opened state in the iris OFF mode, the light blocking rate is 50% in the iris ON mode, and the light blocking rate is 0 to 80% in the iris AUTO mode.

The CPU 18 has a digital/analog converter (DAC) and an analog/digital converter (ADC) and controls the output voltage (0 to Vcc±0.3V) VCLT from the DAC to thereby change the aperture size of the iris steplessly. Further, the CPU 18 can receive the output voltage of the Hall element 410 of the galvanometer 400 in the iris 17, that is, the Hall element output HOUT, via the ADC so as to obtain the position information of the iris.

Figure 9:
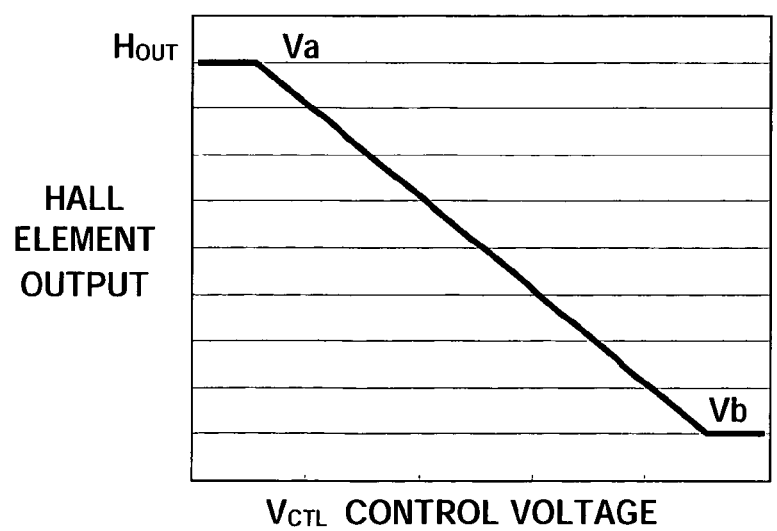
FIG. 9 is a diagram showing a relationship between a control voltage VCTL and a Hall element output HOUT.

FIG. 9 is a graph of the relationship between the control voltage VCTL and the Hall element output HOUT. In FIG. 9, an abscissa indicates the control voltage VCTL, and an ordinate indicates the Hall element output HOUT. Further, in FIG. 9, Va indicates the position in the iris open state (Open), and Vb indicates the position in the iris closed state (Close).

The control voltage VCTL and the Hall element output HOUT have fixed variations, therefore the control voltage VCTL is adjusted, and the value after the adjustment is stored in a not shown memory linking Va and Vb, the control voltage VCTL, and the Hall element output HOUT for example as shown in FIG. 10.

The CPU 18 sets the control voltage VCTL at the value shown below in the iris ON mode or the iris OFF mode.

Time of iris OFF (Open) mode: IrisCtl=Iris CtlOpenCalib

Time of iris ON (Close) mode:
IrisCtl=IrisCtlCloseCalib−(IrisCtlCloseCalib−
IrisCtlOpenCalib)×0.12 (aperture size of 12%)
(decimal point or less is discarded)        (1)

Further, when shifting the mode, the mode is not directly changed to the desired value, but the value is changed by for example 10 steps to obtain the final value in order to reduce the noise in friction.

Here, the fundamental concept of the method of control of the iris aperture rate in the AUTO mode in the CPU 18 will be explained.

For example, in a drive unit of a liquid crystal panel etc., in order to convert the input signal format to the screen size, video signal timing, resolution, etc. corresponding to the output format, at least one frame's worth of the signal is stored once in the frame buffer, then output by the panel driver. The CPU 18 for controlling the iris fetches the APL information (sum) included in one frame before output from the conversion/detection unit 12 and identifies that value. The control signal for obtaining the optimum iris aperture based on the identified APL information is converted from a digital to analog format. In synchronization with the image signal output to the display panel (liquid crystal panel etc.) 16, this control signal VCTL optimized by the APL information is supplied to the iris drive circuit to thereby obtain the optimum iris aperture. The CPU 18 for controlling the iris compares the APL fluctuations before and after the frame and recognizes the difference thereof.

Here the results of an experiment conducted on the, control of the opening/closing operation of the iris and the drive signal level will be explained. When a bright scene changes to a dark scene and the APL value rapidly drops, if closing the iris in a short time from the drop of the APL value and controlling the drive level (increasing it from ordinary drive level) so as to display a predetermined video signal, discontinuity is observed in the transition of the brightness of the scene. This is believed due to the slight time lag between the operation for closing the iris and the change in the state of control of the drive level. This discontinuity of the transition of brightness of the scene is eliminated if closing the iris to a predetermined state and controlling the drive signal level slowly.

Further, right after a change from a bright scene to a dark scene, the iris opens and the video signal is displayed by a predetermined drive signal level. Control was shifted to so as to gradually close the iris and increase the drive signal level from normal to obtain a high contrast ratio. No strangeness could be observed along with the change of contrast ratio in the process.

On the other hand, when a dark scene changes to a bright scene, the APL value rapidly increases, the iris is opened within a short time from the increase of the APL value, and the drive signal level is controlled to display a predetermined video signal as well, similar discontinuity can be observed in the transition of brightness of the scenes. However, it was learned that even if controlling the operation for opening the iris to be faster than the operation for closing the iris, the discontinuity in brightness explained above is eliminated.

In general, the viewer, that is, human vision, temporarily inaccurately perceives the absolute value of brightness at the time of abrupt brightness changes. It takes time until adapting to the surrounding brightness. Further, compared with when moving from a dark place to a bright place, when moving from a bright place to a dark place, more time is required for the eyes become used to the surrounding brightness. Further, even in the case where the brightness of the displayed picture changes, it is believed, a long time is taken until the eyes become used to a picture having brightness and the viewer can enjoy the picture in an optimum state. To prevent a viewer from feeling discomfort based on this characteristic of the eyes, the coefficient required for control suitable for the opening/closing operation of the iris is found, and various parameters related to the driving of the iris are determined.

Below, a further specific explanation will be given of the control of the iris control voltage and gain control value in the CPU 18 of the present embodiment.

When the iris is in the state of the AUTO mode, the CPU 18 detects the value of the input signal level from the register 126 of the conversion/detection unit 12 and makes the iris control voltage VCTL and the setting value STV of the gain (contrast) control register USC_SUBCONT of the signal adjustment unit 14 dynamically variable based on that value. The CPU 18 makes the setting value STV of the gain (contrast) control register USC_SUBCONT dynamically variable in a range of 0 to 63.

The CPU 18 reads out the sum of picture levels detected at the APL detection unit 123 of the conversion/detection unit 12 and set in the register 126 and divides the detected sum by the area based on the detection range (depending upon 2% over scan to top, bottom, left, and right from 100% range/the H/V shift value of each status) set for each status and thereby calculates the APL value (first value). This APL detection is carried out for example every 100 ms.

Concerning the APL detection, it is necessary to set the register Top/Bottom/Left/Right of the detection area for each status (for each format of the input signal) as mentioned above. As these values, for example the CPU 18 calculates the value of Vshift/Vresolution/Hshift/Hresolution by each status. The value of Vresolution/Hresolution is fixed in status. As Vshift/Hshift, the actually reflected value is referred to. For example, when the user shifts the valid image region to the horizontal and/or vertical direction by a not shown remote control device and the values of Vshift/Hshift are changed, the CPU 18 receives the notification thereof by the scan converter 13, refers to the changed values, and sets the values of the register Top/Bottom/Left/Right. In the case of an unknown signal, the Vresolution/Hresolution values are referred to from the original status.

Top $(cn\text{DetectArea}T)=V\text{shift}+(V\text{resolution}*0.02)$

Bottom $(cn\text{DetectArea}B)=V\text{shift}+(V\text{resolution}*0.98)$ (2)

Note that in the case of an interlace signal, it is necessary to halve the Top/Bottom values found by computation.

Left $(cn\text{DetectArea}L)=H\text{shift}+(H\text{resolution}*0.02)$

Right $(cn\text{DetectArea}R)=H\text{shift}+(H\text{resolution}*0.98)$ (3)

When the value of the APL detection unit 123 exceeds the limit value, it is clipped to the limit value and processed.

In the present embodiment, it is possible for the user to shift the valid image region to the horizontal and/or vertical direction by using a not shown remote control device and change the values of Vshift/Hshift. It is notified from the scan converter 13 to the CPU 18 that this change occurred. The CPU 18 calculates the values of the register Top/Bottom/Left/Right according to the above equations and sets the register value of the conversion/detection unit 12.

Then, the CPU 18 finds the area from the values of the register Top/Bottom/Left/Right.

Area=(Bottom−Top)*(Right−Left)>>14 (decimal point or less is discarded) (4)

The CPU 18 reads the sum of input signals set in the register 126 by the APL detection unit 123 for example every 100 ms. By dividing this detected sum by the area found in the above description, the APL value (first value) is calculated. Note that this calculated APL value must be corrected for each input signal since it is necessary to match the level in the detection area.

In the present embodiment, the calculated APL value must be matched in signal level for each input signal (digital signal or analog signal), so the CPU 18 corrects the APL calculated value. Below, the example of correction of the APL value corresponding to each signal format is shown.

(1) Case of Composite/S-Video/Analog Component/RGB/PC, APL=APL value·1023/882

(2) Case of DVI-Video GBR/HDMI-HDMI MODE (Others)/HDMI-DVI MODE, APL=(APL value-16)·255/219

(3) In case of DVI-Computer/HDMI-HDMI MODE (VGA60), APL=APL value (no necessity of correction)

The CPU 18 finds the control voltage VCTL of the iris 17 and the gain control value VST by the APL value corrected in this way or the present APL value not requiring correction.

As the detection algorithm in the CPU 18, the change of APL which was detected at the APL detection unit 123 of the conversion/detection unit 12 and set in the register 126 is not directly read, but the change of APL is divided by a weight coefficient to reduce the change and reduce the strange feeling of the image due to any abrupt change.

The CPU 18 calculates the iris control value IrisCtl (VCTL) and the gain control value VST based on the following equation.

Correction value $[x\text{APL}n]$=previous corrected value $[x\text{APL}n\text{-}1]$+(present APL [CorrectAPL]−previous corrected value $[x\text{APL}n\text{-}1]$)/weight coefficient (5)

Note that, as shown in equation 5, hereinafter, the correction value is indicated as xAPLn, the previous correction value as xAPLn-1, and the current APL as CorrectAPL.

Further, by using a different weight coefficient for a change in a direction becoming bright and for a change in a direction becoming dark, control suited to brightness adaptation/darkness adaptation of human vision and suited to the opening/closing operation of the iris is carried out. Here, the second value, APL value, is found.

[CorrectAPL$n>x$APL$n$-1 (when it becomes bright)]×
 APL$n=x$APL$n$-1+(CorrectAPL$n$-$x$APL$n$-1)/$w$ (6)

[CorrectAPL$n<x$APL$n$-1 (when it becomes dark)]×
 APL$n=x$APL$n$-1+(CorrectAPL$n$-$x$APL$n$-1)/$z$ (7)

Here, the weight coefficient w when the scene becomes bright is set at for example "8", and the weight coefficient z when the scene becomes dark is set at for example "32". Namely, by setting the weight coefficient w when the scene becomes bright to a value smaller than the weight coefficient z when it becomes dark, a quick response to the brightness is enabled, while when the scene becomes dark, control able to obtain a high contrast and gradation using the iris is gradually shifted to.

Figure 11:
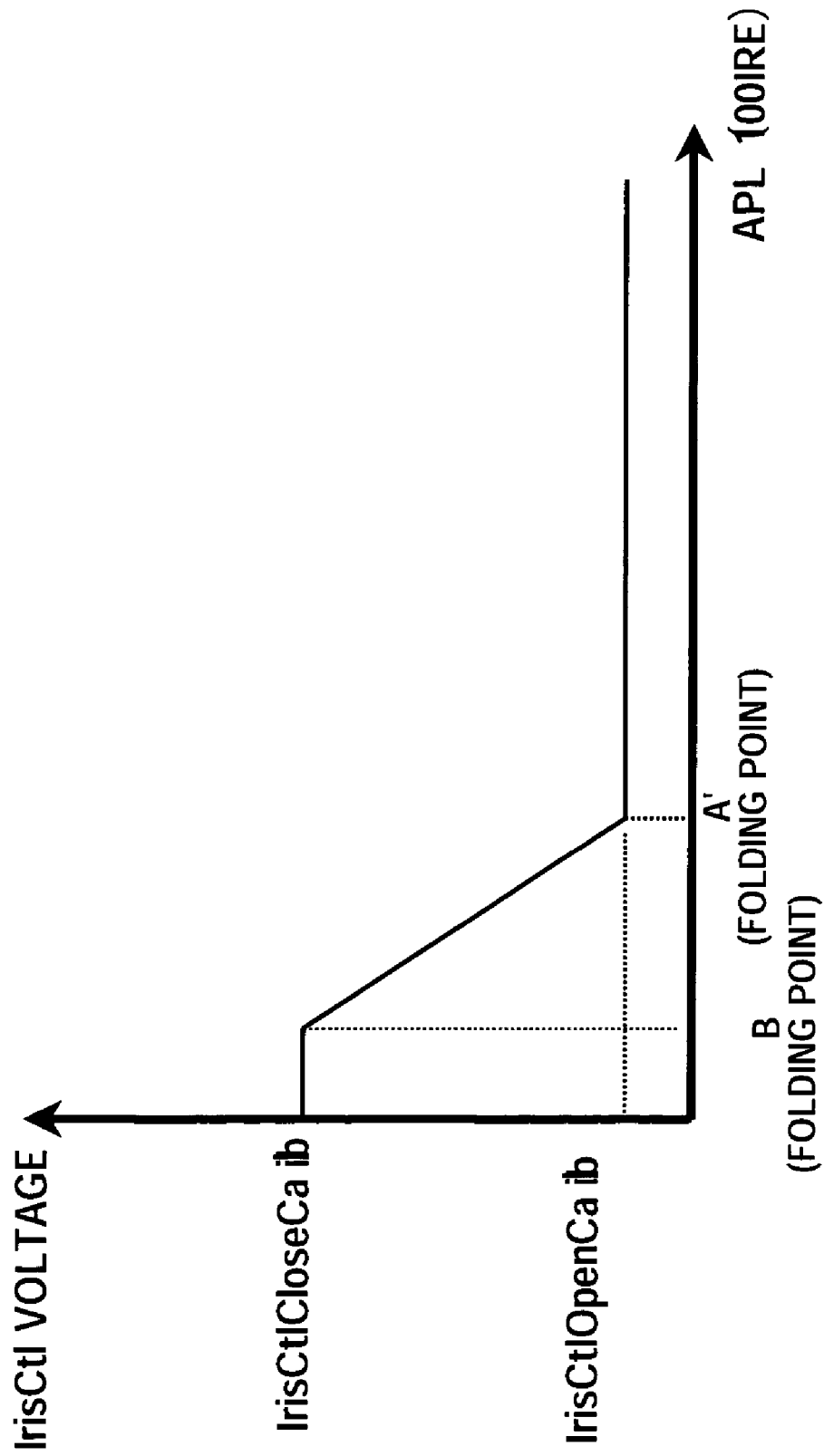
FIG. 11 is a graph of the relationship between an average picture level (APL) value and an iris control value IrisCtl (VCTL)

FIG. 11 is a graph of the relationship between the APL value and the iris control value IrisCtl (VCTL).

In FIG. 11, the abscissa indicates the APL value, and the ordinate indicates the iris control value IrisCtl (VCTL). Further, in FIG. 11, the value of B is set at for example 10 (corresponding to 4IRE), and the value of A' is set at for example 255 (corresponding to 100IRE).

At the time of the iris AUTO mode, under the above conditions, the iris control voltage is found by the following equations:

[When A'>xAPLn>B]IrisCtl=−(IrisCtlCloseCalib−
 IrisCtlOpenCalib)/(A'−B)*(xAPLn−B)+IrisCtl-
 CloseCalib (8)

[When B>xAPLn>0]IrisCtl=IrisCtlCloseCalib (9)

The control of the iris control voltage divides the value to three in a section of 100 ms to reach the target value.

Further, the CPU 18 calculates and dynamically controls the value STV of the gain (contrast) control register USC_SUBCont of the signal adjustment unit 14 from the value of xAPLn in parallel to this.

Figure 12:
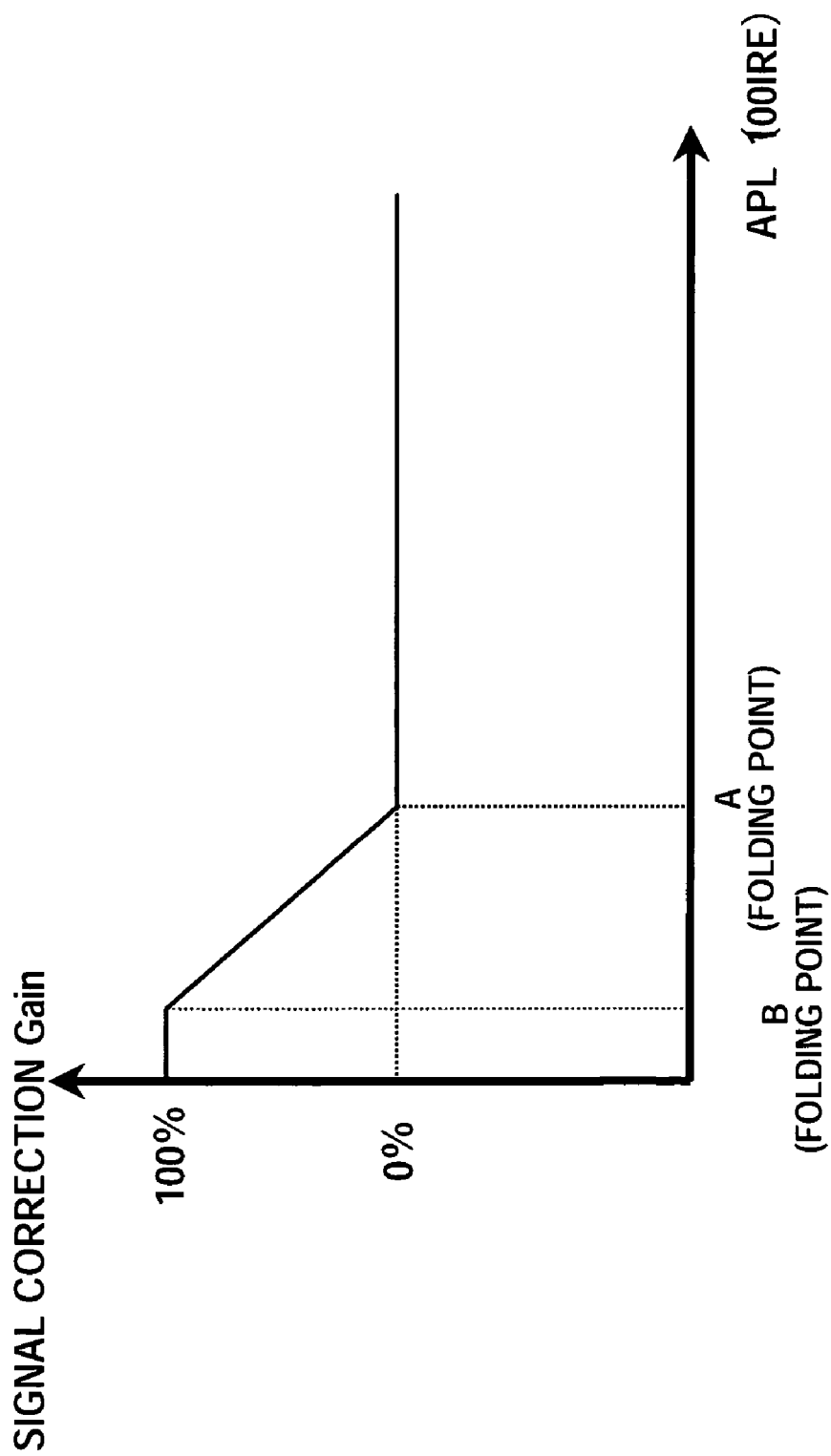
FIG. 12 is a graph of the relationship between an APL value and a signal correction gain control value Gain.

FIG. 12 is a graph of the relationship between the APL value and the signal correction gain control value Gain. In FIG. 12, the abscissa indicates the APL value, and the ordinate indicates the gain control value Gain (STV). Further, in FIG. 12, the value of B is set at for example 10 (corresponding to 4IRE), and the value of A is set at for example 80 (corresponding to 30IRE).

In the iris 17, a change appears in the luminance from the state where reduction of about 50% is carried out. For this reason, when the control start APL value and the gain control start APL value of the iris 17 are the same, irrespective of no change of luminance, a phenomenon of the gain rising occurs. Therefore, in the present embodiment, by setting the APL value of iris control start to 100 IRE, the APL value of gain control start to 30IRE, control is performed so as to obtain the optimum image.

Figure 13:
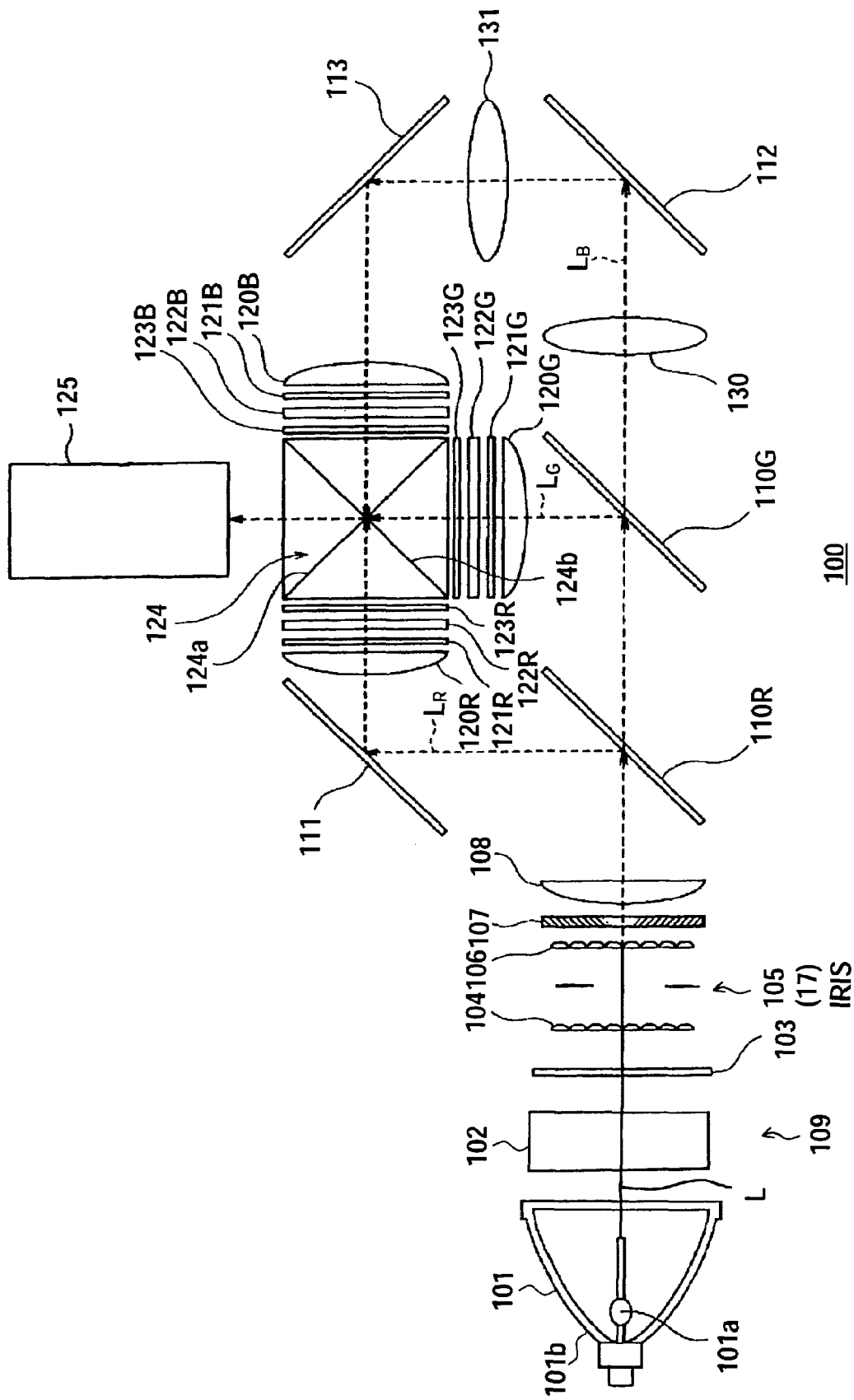
FIG. 13 is a diagram of a liquid crystal projector (projection type display device) employing a display device according to an embodiment of the present invention.
Figure 14:
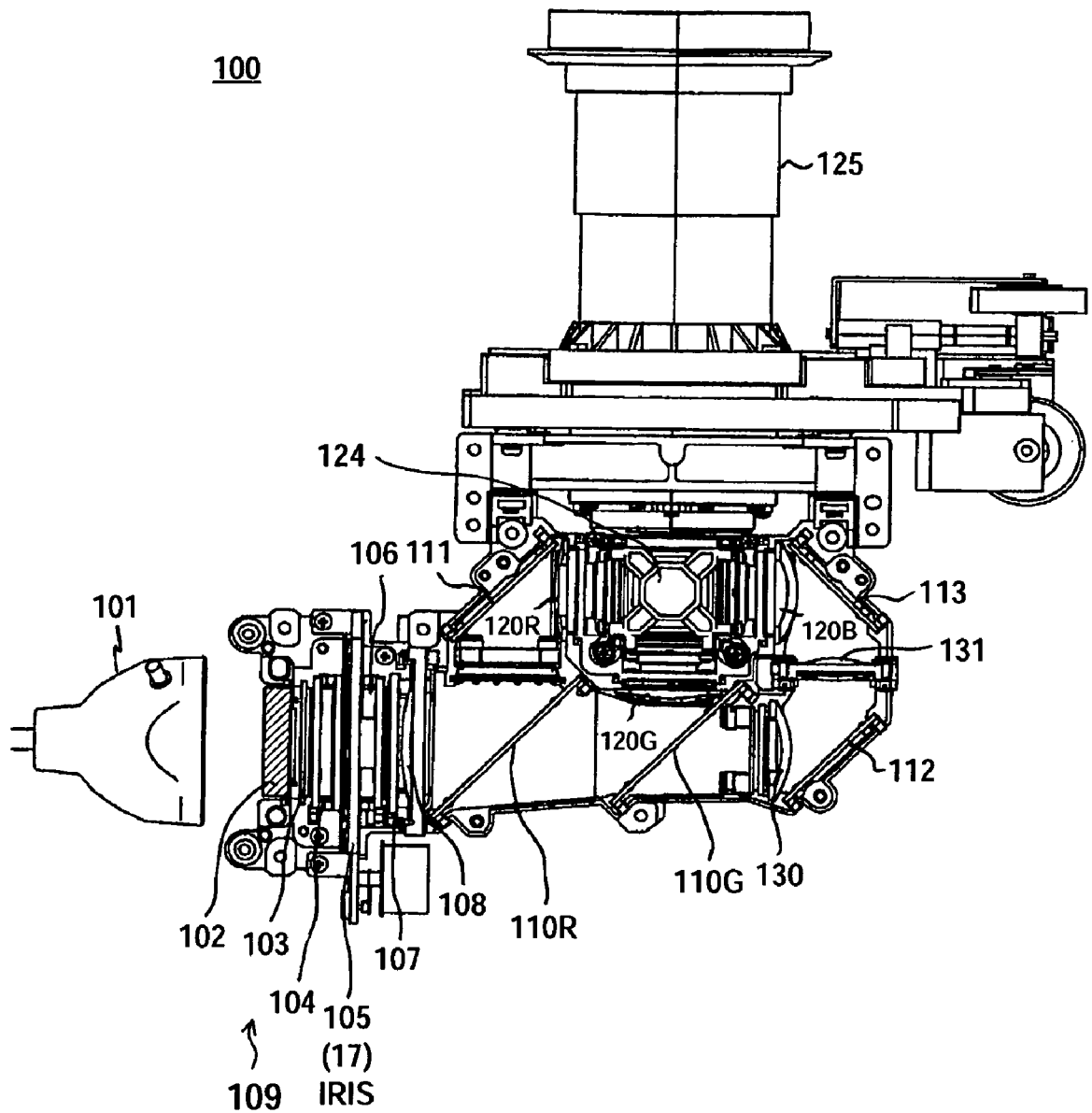
FIG. 14 is a diagram of a mounting embodiment of a liquid crystal projector (projection type display device) employing a display device according to the present invention.

FIG. 13 is a diagram of a liquid crystal projector (projection type display device) employing a display device according to an embodiment of the present invention. FIG. 14 is a diagram of a mounting embodiment of a liquid crystal projector (projection type display device) employing a display device according to an embodiment of the present invention;.

The liquid crystal projector 100 is, as shown in FIG. 13 and FIG. 14, configured by a light source 101, a collimator lens 102, an optical filter 103, a first MLA 104, an iris 105, a second MLA 106, a polarization conversion element 107, a condensing lens 108, dichroic mirrors 110R and 110G, reflection mirrors 111, 112, and 113, condensing lenses 120R, 120G, and 120B, polarization plates 121R, 121G, and 121B, liquid crystal panels 122R, 122G, and 122B, polarization plates 123R, 123G, and 123B, a dichroic prism 124, a projection optical system 125, relay lenses 130 and 131, and so on. The illumination optical device 109 is configured by the light source 101, the collimator lens 102, the optical filter 103, the first MLA 104, the iris 105, the second MLA 106, the polarization conversion element 107, and the condensing lens 108.

The iris 105 of the characterizing portion of the present embodiment is a variable aperture illumination iris which has the same configuration as the iris 17 in the display device 10 mentioned above, is arranged in the middle of the optical path between the first MLA 104 and the second MLA 106, specifically at substantially the center between the positions of arrangement of the first MLA 105 and the second MLA 106, and opens/closes concentrically with respect to the light axis (solid line indicated as the illumination light L).

The iris 105 having such a configuration has the following characteristic features.

It is arranged between the first MLA 104 and the second MLA 106 of the illumination optical device 109 and at substantially the intermediate position between the two. The iris aperture is shaped close to a circle, therefore the iris blinds have the same shapes and form an aperture closest to a true circle at the time of the minimum iris aperture size. In the present embodiment, six is selected as the optimum number of the iris blinds 301 to 306.

<Optimum number of iris blinds: 6> When the number of blinds is decreased, the iris shape does not become circular, therefore the uniformity of the distribution of the amount of illumination light on the liquid crystal panel is spoiled. The number of blinds able to most approximate a true circle for a change of the aperture size of the iris is selected. When the number exceeds six, the cost rises and the complexity of the system for making up for the increase of the drive friction resistance increases. There is an effect of increasing the F number of the beam focused to the liquid crystal panel. The angle component of the beam striking each cell of the liquid crystal panel is reduced, therefore the polarization efficiency is improved. This effectively acts for the improvement of the contrast.

Further, the iris 105 is not arranged adjacent to the first MLA 104 surface. This is because the first MLA 104 and the liquid crystal panel have a substantially conjugate relationship. The nonuniformity of the degree of illumination inside the surface of the light source beam passing through the cell near a boundary of aperture edges of the iris blinds 301 to 306 lowers the uniformity when focused to the liquid crystal panel.

Further, the iris 105 is not disposed adjacent to the second MLA 106 surface. This is because the light source beam passed through each cell lens of the first MLA 104 is focused onto the cell lens of the corresponding second MLA surface, therefore the distribution of the illumination becomes discrete on the second MLA 106 surface. This is because in an iris having a single aperture centered on the light axis of the lamp light source 101, the relationship between the aperture size and the irised light amount becomes a sawtooth like distribution, and the linearity is degraded.

From the above description, as the result of the experiments carried out on the position of arrangement of the iris 105, when the iris 105 has substantially equal distances from the first MLA 104 and the second MLA 106, the optimum uniformity and linearity of the change of light amount could be obtained. The light source lamp is always on, therefore, in the 100% blocking state, all of the light energy from the lamp light source passing through the first MLA 104 reaches the iris blinds 301 to 306. The temperature rise accompanying the heat absorption to the blind surfaces is remarkable. Even where the forcible cooling of the iris is stopped due to some sort of system abnormality, a portion of the light source beam (illumination light L) passes, therefore the risk of a remarkable rise in temperature is avoided. Further, the iris 105 employs not a stepping motor, but a galvanometer as the drive device. Below, an explanation will be given of the configurations and functions of components of the liquid crystal projector 100.

The light source 101 is configured by a discharge lamp 101a and a reflection condensing mirror 101b. The reflection condensing mirror 101b condenses the light emitted from this discharge lamp 101a and emits it toward the collimator lens 102.

The collimator lens 02 changes the illumination light L emitted from the light source 101 to parallel fluxes and emits the same toward the optical filter 103.

The optical filter 103 eliminates unrequired light in an infrared-ray region and an UV-ray region included in the illumination light L via the collimator lens 102.

The first MLA 104 divides the illumination light L from the light source 101 to a plurality of lights and arranges the optical image of them in the vicinity of the light incident surface of the second MLA 106. More specifically, in the first MLA 104, a plurality of lenses are arranged in an array, the illumination light L is divided to a plurality of images, the divided images are condensed, and optical spots of the divided images are arranged at predetermined positions (vicinity of the light incident surface of the second MLA 106).

The iris 105 is arranged between the first MLA 104 and the second MLA 106 of the illumination optical device 109 and at substantially the intermediate portion between the two with substantially equal distances and opens/closes concentrically with respect to the light axis. The iris 105 is controlled so that the iris aperture size is large when the average luminance level is high and the iris aperture size is small when the average luminance level is low, that is, is continuously changed so as to obtain the optimum iris aperture size in accordance with the average luminance level of the video signal. The iris 105 is controlled so that the illumination F number becomes the maximum on the black side. Further, the iris 105 is controlled so that the illumination F number becomes the minimum, then the iris aperture size becomes 100% on the white side. The iris 105 is structured so that the aperture size does not become 0%. In the iris 105, the number of iris blinds having the same shape is six or more. These iris blinds are synchronously opened/closed. The surfaces of the iris blinds are finished by gloss plating, and projections are provided on the surfaces of the blinds in regions where the blinds are superimposed with each other so that point contact is possible. Further, the iris 105 is structured mounting the driving actuator and the aperture position detecting sensor of the blinds in a heat insulated manner. The driving actuator is arranged on the emitting surface side with respect to the light source 101. Further, the iris 105 is structured forcibly cooling the driving actuator and is structured forcibly cooling the blinds of the illumination iris and its periphery. Further, the iris 105 is configured so as not to use an actuator operation stroke limit (mechanical end position).

The second MLA 106 makes the light source images divided by the first MLA 104 strike the polarization conversion element 107 so as to become able to be incident as the illumination lights of the liquid crystal panels 122R, 122G, and 122B. In the second MLA 106, a plurality of lens corresponding to a plurality of light spots condensed by the first MLA 104 are arranged. These lenses are used to superpose and combine the images divided by the first MLA 104 for emission.

The polarization conversion element 107 is configured by for example a polarized beam splitter arranged in a strip shape and phase difference plates intermittently provided corresponding to this, converts the p-polarization component of the incident illumination light L to an s-polarization component, and outputs illumination lights having polarization directions made uniform and including large s-polarization components as a whole.

The condensing lens 108 condenses the illumination lights L passed through the polarization conversion element 107 so that they are superimposed on each other on the liquid crystal panels 122R, 122G, and 122B.

The dichroic mirror 110R is inclined by 45 degrees with respect to the light axis of the illumination lights L passed through the focus condensing 108 and having uniform polarization directions made, reflects only the light LR having a red wavelength region among the illumination lights L toward the reflection mirror 111, and passes the lights LGB of other wavelength zones therethrough.

The reflection mirror 111 is inclined by 45 degrees with respect to the light axis of the light LR reflected at the dichroic mirror 110R and reflects the light LR toward the focus lens 120R.

The dichroic mirror 110G is inclined by 45 degrees with respect to the light axis of the lights LGB transmitted through the dichroic mirror 110R, reflects only the light LG of the green wavelength zone among the lights LGB passed through the dichroic mirror 110R toward the condensing lens 120G, and passes the light LB of the other wavelength zone (blue wavelength zone) therethrough.

The relay lenses 130 and 131 are provided in the middle of the optical path in order to focus the blue light LB again since the optical path length from the dichroic mirror 110G of the light LB of the blue wavelength zone to the liquid crystal panel 122B is relatively long. The blue light LB passing through the dichroic mirror 110G passes through the relay lenses 130 and 131 and is reflected by the reflection mirror 113 toward the condensing lens 120G.

The condensing lenses 120R, 120G, and 120B and the liquid crystal panels 122R, 122G, and 122B are arranged at predetermined positions with respect to three side surfaces of the dichroic prism 124 having a cubic shape. Further, on the incident side and emitting side of the liquid crystal panels 122R, 122G, and 122B, the polarizers constituted by the polarization plates 121R, 121G, and 121B and the photodetectors constituted by the polarization plates 123R, 123G, and 123B are arranged in parallel. The polarization plates 121R, 121G, and 121B are fixed to the emitting side of the condensing lenses 120R, 120G, and 120B, and the polarization plates 123R, 123G, and 123B are fixed to three surfaces of the incident side of the dichroic prism 124.

The liquid crystal panels 122R, 122G, and 122B modulate intensities of the color lights LR, LG, and LB incident through the condensing lenses 120R, 120G, and 120B by video signals corresponding to the applied three primary colors of red, green, and blue. Namely, the color lights LR, LG, and LB in predetermined polarization directions passed through the polarization plates 121R, 121G, and 121B rotate in polarization planes based on the video signals applied to the liquid crystal panels 122R, 122G, and 122B. The predetermined polarization components of lights rotated in their polarization planes pass through the polarization plates 123R, 123G, and 123B and strike the dichroic prism 124.

The dichroic prism 124 is configured by for example joining a plurality of glass prisms. The joint surfaces of the glass prisms are formed with interference filters 124a and 124b having predetermined optical characteristics. The interference filter 124a reflects the blue light LB and passes the red light LR and the green light LG therethrough. The interference filter 124b reflects the red light LR and passes the green light LG and the blue light LB therethrough. Accordingly, the color lights LR, LG, and LB modulated by the liquid crystal panels 122R, 122G, and 122B are combined and strike the projection optical system 125.

The projection optical system 125 projects for example the video light incident from the dichroic prism 124 toward a projection surface such as a screen. The color picture is projected on the screen.

As explained above, according to the present embodiment, the APL of the input signals is detected. Based on the detected value, not only is the iris 17 dynamically controlled (is the control voltage of the iris controlled), but also the gain (contrast) control register of the signal adjustment unit 14 is dynamically controlled, therefore it becomes possible to achieve a contrast ratio of 6000:1. Further, the control of the iris (100IRE) and the gain control (30IRE) of the signal adjustment unit 14 are started by different APL values and the control is performed so as to obtain the optimum image. In the iris 17, change of the luminance appears from the status irised at 50%, but, when the control start APL value and the gain control start APL value of the iris 17 are the same, irrespective of no change of the luminance, the phenomenon of the rise of the gain can be prevented. Further, the digital signal (HDMI input) and the analog signal have different input levels (APL values), therefore the APL detection unit corrects both of the signals so that the APL values of the digital signal and the analog signal become the same, so it is possible to control the image so as not to become different between the two signals. Further, as the detection algorithm of the APL, the change of the APL is not directly read, but the change of the APL is divided by a weight coefficient to reduce the amount of change and prevent a strange feeling of the image due to any abrupt change. Further, by using different weight coefficients for a change in a direction where the scene becomes bright and for a change in the direction where the scene becomes dark, it is possible to perform control adapted to brightness adaptation/darkness adaptation of human vision and adapted to an iris opening/closing operation.

Namely, according to the present embodiment, by dynamically controlling the iris, the defect of the entire image becoming dark even in a bright image and resulting in an image giving a bad impression, a defect at the time of the ON mode in a past iris, can be solved. That is, it becomes possible to always view an image giving a good impression for example, a sharp contrast, in a dark scene and maintain the brightness in a bright scene. When the level difference between the digital signal and the analog signal is not corrected at the time of the APL detection, the manner of viewing the image becomes different between the time of digital signal input and the time of analog signal input, but it is possible to view an image having no difference between the digital signal and analog signal by using an APL value correction algorithm. In the detection algorithm of the APL, by control not directly reading the change of the APL, but dividing the change of the APL by a weight coefficient to reduce the change and by control setting the start APL values of the iris control and the gain control at different values, a strange feeling etc. of the image due to an abrupt change is prevented and it becomes possible to provide to the user a wonderful image without strange feeling.

Further, when the illumination iris according to the present embodiment is disposed at the predetermined position, the contrast ratio of the video projected onto the screen can be greatly improved without changing the optical design of the past illumination optical system. The increase of the volume occupied by the illumination optical system by disposing the iris occurs at only the periphery of the iris mount, so a great improvement of the performance can be achieved without spoiling the commercial value. By controlling the illumination F number to become the maximum on the black side, a further rise of contrast ratio is expected.

In the above embodiments, the explanation was given of the case of controlling the aperture of the iris and the signal level for driving the display panel 16 based on the average luminance information of the video signal, but the invention can also be applied to the case of controlling only the aperture of the iris based on the average luminance information of the video signal. At a dark scene, the overall output falls, but a high contrast ratio is obtained, while at a bright scene, the brightness is maintained. Further, even when a bright scene changes to a dark scene, it is possible to prevent a strange feeling in an image due to the abrupt change of the iris and provide a good image.

It should be understood by those skilled in the art that various modifications, combinations, sub-combinations and alterations may occur depending on design requirements and other factors insofar as they are within the scope of the appended claims or the equivalents thereof.

What we claim is:

1. A display device comprising:
a variable aperture iris and
a control circuit for controlling opening/closing of the iris in accordance with a state of a level of an input signal forming a screen, wherein
the control circuit controls the iris so that a response of an open/close operation of the iris is different between a case where the signal level fluctuates from a dark level to a bright level and a case where the signal level fluctuates from a bright level to a dark level.

2. A display device as set forth in claim 1, wherein the control circuit controls the iris so that the response of the open/close operation of the iris becomes faster in the case where the signal level fluctuates from a dark level to a bright level in comparison with the case where the signal level fluctuates from a bright level to a dark level.

3. A display device as set forth in claim 2, wherein the control circuit divides a sum of signal levels of a designated detection area in the screen by an area of the detection area to obtain a first value, divides a change of the first value by a predetermined weight coefficient to obtain a second value, and sets a control signal value of the iris based on the second value.

4. A display device as set forth in claim 3, wherein the control circuit performs the division by weight coefficients different between the case where the signal level fluctuates from a dark level to a bright level and the case where the signal level fluctuates from a bright level to a dark level.

5. A display device as set forth in claim 3, wherein the device has a register able to designate the detection area and able to shift the detection area in at least one of a horizontal direction and a vertical direction of the detection area, and the control circuit calculates a value for designating the detection area based on the instructed shift and sets it in the register when receiving an instruction of a shift to at least one of the horizontal direction and the vertical direction of the detection area.

6. A display device as set forth in claim 3, wherein the control circuit performs correction processing matching the first value with the format of an input signal.

7. A display device comprising:
a variable aperture iris,
a control circuit for controlling opening/closing of the iris in accordance with a state of a level of an input signal forming a screen, and
a signal adjustment unit able to adjust the gain of the signal to be displayed, wherein
the control circuit controls the iris so that the response of the open/close operation of the iris differs between the case where the signal level fluctuates from a dark level to a bright level and the case where the signal level fluctuates from a bright level to a dark level, then makes the signal adjustment unit adjust the gain corresponding to the iris control.

8. A display device as set forth in claim 7, wherein the control circuit controls the iris so that the response of the open/close operation of the iris becomes faster in the case where the signal level fluctuates from the dark level to the bright level in comparison with the case where the signal level fluctuates from the bright level to the dark level.

9. A display device as set forth in claim 8, wherein the control circuit divides a sum of signal levels of a designated detection area in the screen by an area of the detection area to obtain a first value, divides a change of the first value by a predetermined weight coefficient to obtain a second value, and sets a control signal value of the iris based on the second value.

10. A display device as set forth in claim 9, wherein, when controlling the iris and the gain of the signal adjustment unit based on the second value, the control circuit sets the first value starting the control different between the control of the iris and the control of the contrast of the signal adjustment unit.

11. A display device as set forth in claim 9, wherein the control circuit performs the division by weight coefficients different between the case where the signal level fluctuates from a dark level to a bright level and the case where the signal level fluctuates from a bright level to a dark level.

12. A display device as set forth in claim 9, wherein the device has a register able to designate the detection area and able to shift the detection area in at least one of a horizontal direction and a vertical direction of the detection area, and the control circuit calculates a value for designating the detection area based on the instructed shift and sets it in the register when receiving an instruction of a shift to at least one of the horizontal direction and the vertical direction of the detection area.

13. A display device as set forth in claim 9, wherein the control circuit performs correction processing matching the first value with the format of an input signal.

14. A display device comprising:
a light modulating unit for modulating incident illumination light based on an input image signal and emitting the result, a variable aperture iris unit for opening or closing an iris so as to form an aperture having a concentric circular state with respect to a light axis and adjusting the amount of the incidence of the illumination light upon the light modulating unit based on a control signal, a detection unit for detecting a mean signal level of input image signals, a signal adjustment unit able to adjust the gain of the image signal to be displayed, and a control circuit for controlling the iris so that the response of the open/close operation of the iris is different between the case where the signal level fluctuates from a dark level to a bright level and the case where the signal level fluctuates from a bright level to a dark level, then making the signal adjustment unit adjust the gain corresponding to the iris control.

15. A display device as set forth in claim 14, wherein the control circuit controls the iris so that the response of the open/close operation of the iris becomes faster in the case where the signal level fluctuates from a dark level to a bright level in comparison with the case where the signal level fluctuates from a bright level to a dark level.

16. A display device as set forth in claim 15, wherein the control circuit divides a sum of signal levels of a designated detection area in the screen by an area of the detection area to obtain a first value, divides a change of the first value by a predetermined weight coefficient to obtain a second value, and sets a control signal value of the iris based on the second value.

17. A display device as set forth in claim 16, wherein, when controlling the iris and the gain of the signal adjustment unit based on the second value, the control circuit sets the first value starting the control different between the control of the iris and the control of the gain of the signal adjustment unit.

18. A display device as set forth in claim 16, wherein the control circuit performs the division by weight coefficients different between the case where the signal level fluctuates from a dark level to a bright level and the case where the signal level fluctuates from a bright level to a dark level.

19. A display device as set forth in claim 16, wherein the device has a register able to designate the detection area and able to shift the detection area in at least one of a horizontal direction and a vertical direction of the detection area, and the control circuit calculates a value for designating the detection area based on the instructed shift and sets it in the register when receiving an instruction of a shift to at least one of the horizontal direction and the vertical direction of the detection area.

20. A display device as set forth in claim 16, wherein the control circuit performs correction processing matching the first value with the format of an input signal.

\* \* \* \* \*